United States Patent [19]

Humphrey et al.

[11] Patent Number: 5,017,788

[45] Date of Patent: May 21, 1991

[54] ALPHA-DETECTING CONVEYOR APPARATUS

[75] Inventors: Martin D. Humphrey, Vincentown; Alfred N. Johnson, Mt. Laurel, both of N.J.

[73] Assignee: Westinghouse Electric Corp., Pittsburgh, Pa.

[21] Appl. No.: 414,983

[22] Filed: Sep. 29, 1989

[51] Int. Cl.$^5$ .............................................. G01T 1/16
[52] U.S. Cl. .................................. 250/385.1; 250/394; 250/336.1
[58] Field of Search .................. 250/336.1, 394, 385.1, 250/359.1

[56] References Cited

U.S. PATENT DOCUMENTS

| | | |
|---|---|---|
| 3,373,869 | 8/1965 | Burson, Jr. . |
| 4,036,365 | 7/1977 | Rosenfeld . |
| 4,136,778 | 1/1979 | Wortman et al. . |
| 4,253,025 | 2/1981 | Fergus .............................. 250/385.1 |
| 4,599,513 | 7/1986 | Prisco et al. ...................... 250/336.1 |
| 4,707,606 | 11/1987 | Keller . |
| 4,785,186 | 11/1988 | Street et al. . |
| 4,862,005 | 8/1989 | Johnson et al. .................. 250/336.1 |
| 4,866,277 | 9/1989 | Johnson et al. .................. 250/336.1 |

OTHER PUBLICATIONS

"Automated Conveyor Monitor for Laundry, Model ACM-L" by Eberline, a subsidiary of Thermo Instrument Systems, Inc.
"Automated Laundry Monitor" by Bicron Corporation, Including drawing.
"Stop Hand-Frisking Laundry!" by National Nuclear Corporation, dated 8/3/87.
INS Automated Laundry Monitor, published by the INS Corporation.
"Ludlum Model 329-1 Laundry Monitor" by Ludlum Measurements, Inc.

Primary Examiner—Janice A. Howell
Assistant Examiner—Drew A. Dunn
Attorney, Agent, or Firm—W. S. Stevens

[57] ABSTRACT

An improved apparatus for detecting radioactive contamination in garments. The apparatus includes a pair of radiation detectors spaced along a conveyor path. The conveyor system conveys the garments in a compressed condition and the garments are biased toward each of the detectors as they are conveyed therepast. A housing is provided with an air filtering system such that the conveyors are enclosed in a ventilated structure and the spread of contaminants accumulating within the housing is prevented. Preferably the conveyors include a thin, open grid arrangement which is strong, non-stick and includes an electrically conductive material which dissipates static charges. The detectors are gas-flow proportional and may be operated at a voltage optimized for sensing alpha particles. The detectors may also include plural zones some of which are operated at a voltage optimized for sensing alpha particles while others are operated at a voltage optimized for sensing beta particles.

32 Claims, 3 Drawing Sheets

ALPHA-DETECTING CONVEYOR APPARATUS

BACKGROUND OF THE INVENTION

The invention generally relates to a radiation detecting device and particularly to an improved device for detecting alpha particles in garments used in nuclear power or nuclear material handling facilities.

Unlike gamma and beta type radiation alpha particle radiation is a type of non-penetrating radiation which is easily blocked by thin amounts of a fabric or even air. Consequently, a radiation detector must be placed closely adjacent to an article being examined to detect alpha radiation contamination. In the past, garments suspected to being contaminated have been frisked with small hand-held probes. While hand frisking allows the operator to hold the probe close enough to detect alpha particles, it is time consuming, and contaminated areas of a garment may be overlooked as a result of operator error. In addition, special training is required for the operator to be able to monitor very low radiation count rates.

Conveyer-type devices for simultaneously detecting gamma, beta and alpha radiation are know. A conveyer apparatus for detecting radioactive material in garments is disclosed in applicant's copending application Ser. No. 07/201,807, filed June 2, 1988, which is incorporated herein by reference. Generally, these devices include a horizontal conveyer belt with a radiation detector mounted adjacent to the belt for determining whether any of the garments radiate unacceptable levels of radioactivity. Such devices are typically used after the garments have been subjected to a decontamination cleaning process. The garments are then fed into the conveyer detection device. If the level of radiation detected exceeds a predetermined level, an alarm notifies the operator that further decontamination or disposal is necessary. Unfortunately applicants have observed that conventional automated monitoring systems, do not insure that all areas of the article being scanned will be positioned sufficiently close to the detector to allow detection of short-range alpha particle radiation. In addition, the conveyer belts will often shield (by blocking or increasing the particle travel distance through air) the radiation from the detectors.

Another problem with known conveyer devices that applicants have observed is that static charges may develop as a result of garments rubbing together during drying, or as a result of friction between the conveyer belts or other parts of the monitoring system. Static charges discharging into or around the detector may damage the detector or cause electrical noise which may be incorrectly interpreted as radiation. Static charges can also deflect or distort the path of alpha particles, thereby preventing them from reaching the detector. In addition, static charges attract dust or other foreign matter to the conveyer belt which may block radiation from detection. Naturally occurring radon gas daughter products are also attracted by static charges, causing false alarms due to the detection of the radiation emitted by these substances.

A further problem with conventional radiation detecting systems that applicants have observed stems from the use of the same detectors to detect both alpha and beta particles. Specifically, in the gas-flow proportional detectors used in such systems, a single voltage is utilized for the detection of both the alpha and beta particles. However, the optimum voltage for detecting alpha particles is different from that for detecting beta particles, and thus the voltage utilized for detecting both is a compromise. Such a compromise voltage results in a background noise which is too high for accurately measuring low levels of alpha contamination, while being too low for adequate sensitivity to beta radiation.

Clearly, a conveyer-type radiation detecting device is needed which is capable of reliably detecting low energy radiation such as alpha particles in garments as they are conveyed. The device should provide detectors located sufficiently close to every section of the garment as it travels such that all areas of the garment can be accurately monitored for alpha radiation. In addition, the device should be capable of minimizing the possibility of erroneous readings resulting from contaminants on the system. The device should also allow the detectors to be operated under conditions optimized for detecting alpha radiation.

SUMMARY OF THE INVENTION

The present invention provides an improved conveyer type device for monitoring garments for radiation contamination, and in particular for detecting alpha particle radiation. The device includes a conveyer device which grasps and compresses the articles as they are fed past radiation detectors. Upper and lower alpha particle detectors are provided along the conveyer path, wherein one of the detectors is spaced downstream from the other detector. Biased pressure skids are provided along the conveyer travel path in opposition to each detector to maintain a substantially constant pressure on the garment as it passes across the detector. Since the garments are compressed during travel, a greater area of the garment is held closely adjacent to the detector. Even more importantly, the distance particles travel from the garment to the detector is decreased and the ability to detect alpha particles is consequently increased.

Since the upper and lower detectors are spaced apart with respect to the direction of travel, the conveyers can accommodate variations in the garment size, while allowing the skids to hold the garments closely adjacent to the detectors without having to adjust the position of the detectors. For example, if a thick garment is fed past a pair of detectors which are at the same position along the conveyer path, the positioning of either the upper or the lower detector must be adjusted to accommodate the garment thickness. This slows the contamination detecting process and risks the possibility that the operator will overly adjust the detector spacing, thereby diminishing the sensitivity of the device. Moreover, the operator may fail to readjust the spacing once a thinner garment is presented. With the detectors spaced apart with respect to the direction of travel, the device is mechanically simpler since adjusting mechanisms are not required. Consequently, operator errors associated with such adjustments are also avoided. In the spaced detector arrangement of the present invention, the skids maintain the garments closely adjacent to each of the detectors, while accommodating variations in garment size.

The detectors are gas-flow proportional, each preferably including a plurality of independent detection zones. In a preferred embodiment, the detector includes an array of zones with three adjacent zones oriented transverse to the conveyer belt and two adjacent zones in the direction of conveyer travel for a total of six zones. The two adjacent zones in the direction of conveyer travel may be electrically connected together, making the length of alpha detection longer by increasing the residence time under the detector. With this arrangement, the sensitivity of the detector to alpha particles is increased, and the belt may be allowed to operater at a faster speed for a given probability of detection of alpha contamination as compared with the situation in which a single row of zones is present.

Alternatively, the first row of zones may operate at a voltage optimized for alpha particle detection, while the second row of zones is operated at a voltage optimized for detecting radiation with lower specific ionization, such as beta particles, gamma-rays or x-rays. In this arrangement, the detector is less sensitive to alpha particles since the residence time under the alpha detector is decreased; however, detection of multiple types of radiation is permitted. In addition, in this arrangement, discrimination between different types of radiation is improved. As radiation is detected, the magnitude of the resulting pulses is utilized to discriminate between different types of radiation. With each of the respective alpha and beta zones operated at voltages optimized for sensing of alpha and beta particles, it is easier to discriminate between the different types of radiation using a discriminator circuit.

In accordance with another aspect of the invention, the conveyer belt is thin (about 1/16 inches) with approximately 70% of its area open to minimize the shielding effect of the belt and to insure that the garments pass closely adjacent to the detectors. The belt is formed of NOMEX ® and fiberglass to allow the belt to be thin and open, while providing sufficient strength. A TEFLON ® coating is utilized to decrease friction between the belt and the detector. The belt is also impregnated with graphite to dissipate static charges which may develop on the belt.

In use, the operator selects a desired conveyer speed according to the sensitivity desired, and the garments are fed past the detectors. If the level of radiation detected exceeds a predetermined level, an alarm sounds, and an automatic jog reverse of the conveyers occurs. The automatic reverse operates at full speed regardless of the operator's conveyer speed setting to prevent contaminated garments from entering the area to which non-contaminated garments have passed. The automatic full speed jog insures rapid operation of the device, while preventing contaminated garments from entering the non-contaminated area.

DETAILED DESCRIPTION OF THE PREFERRED EMBODIMENT

Figure 1:
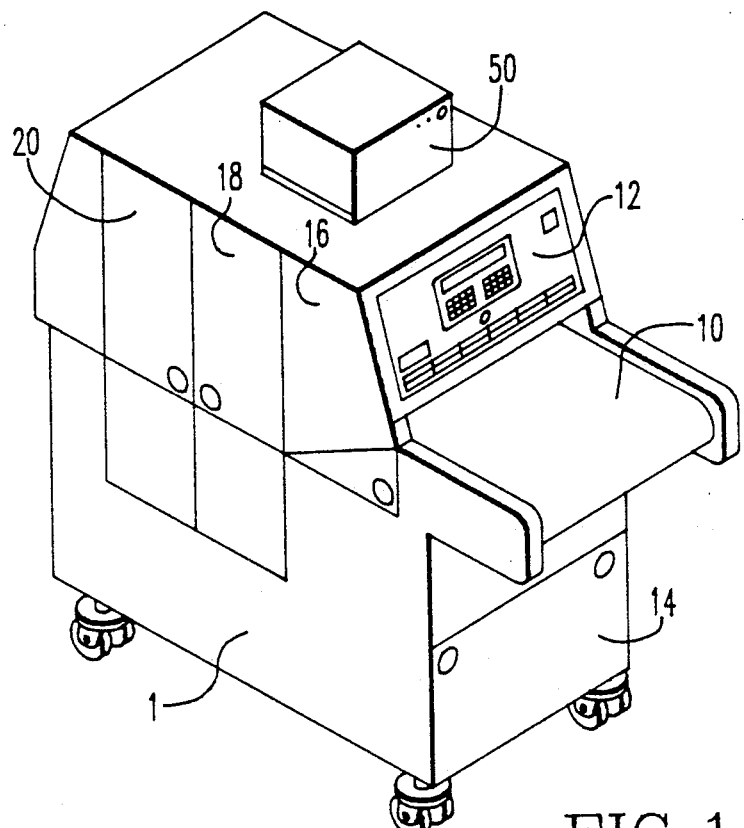
FIG. 1 is a perspective view of the device for detecting radiation contamination of garments.

The device according to the present invention is shown in FIG. 1. In use, an operator places garments on the in-feed conveyer 10, and controls the device at control panel 12. Upon sensing of radioactive contamination in a garment, visual and/or audible alarms on the control panel are actuated to signal the operator that further decontamination or disposal of the garments is necessary. Preferably, the control panel 12 is covered with a thin polyester sheet, such as MYLAR ® to prevent debris or contaminants from entering the system. In addition, the entrance and exit openings of the housing 1 are kept small to minimize access of dust or debris, and to prevent egress of contaminants. Doors 14, 16, 18 and 20 provide access to the interior for performing repairs, adjustments or other maintenance.

Figure 2:
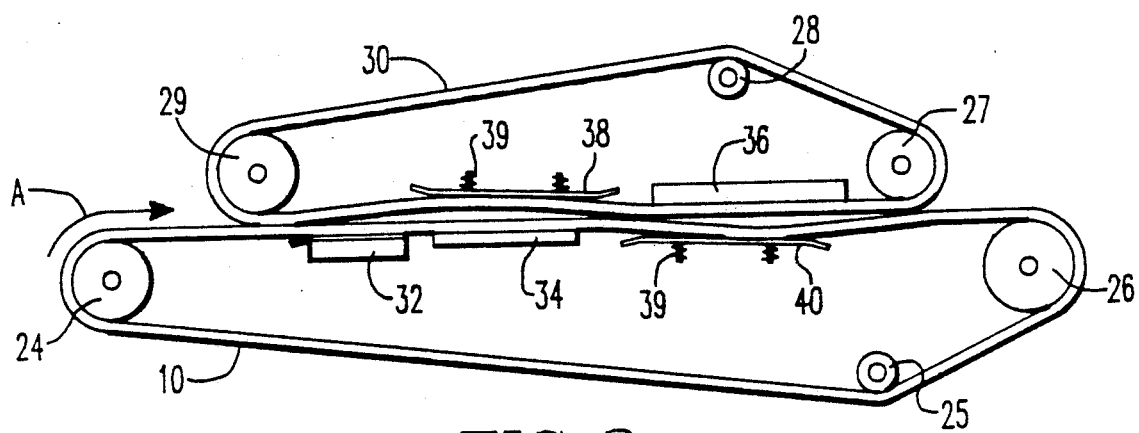
FIG. 2 is a side view of the conveyer and detector arrangement.

The garments enter the conveying-detecting device in the direction indicated by arrow A in FIG. 2. As the garment is conveyed, it is grasped between conveyers 10,30 and compressed. In the compressed condition, the entire garment may be located closely adjacent to the detectors. Due to the close relationship of the conveyer belts, and the ability of the belts to conform to the garment substantially the entire garment is surrounded by the belt, thereby insuring that portions of the garment will not pass the detectors at a distance which may leave contaminated areas undetectable.

The conveyer belts are formed of a grid with longitudinal and transverse strands such that 70% of the belt is open. The open configuration reduces the shielding effects of the belt, thereby improving detection. In addition, the grid or mesh-like nature of the belts allows the belts to easily surround and grasp the article. This also insures that the location/position of the garment is substantially the same for the passes by the two detectors. Preferably, the longitudinal strands of the belt are formed of a nylon material and applicants have found NOMEX (a copolymer of meta-phenylenediamine and isophthaloyl chloride) to be particularly suitable. The NOMEX longitudinal (i.e., in the direction of belt travel) strands provide sufficient flexibility for the belts to bend along guide/drive rollers 24–29 of the conveyer system.

Preferably a strong, less yieldable material such as fiberglass is used for the transverse strands. The transverse strands add strength where yielding is not required (since they pass the conveyer roller substantially parallel to the roller axis and, thus, do not bend). The combined NOMEX and fiberglass grid arrangement provides a thin, open belt with sufficient strength to prevent substantial yielding of the belts (which may result in garment portions being remote from the detectors) while allowing the belt to surround and grasp the article for proper positioning. The open (approximately 70%), thin (approximately 1/16 inches) nature of the belt minimizes the shielding effects of the belt.

In order to reduce static charges on the belts, the belts are impregnated with an electrically conductive material. Static charges can result from the rubbing of the belts against one another or with other portions of the device, or from garments which have been rubbed together during a previous drying process. Static charges may discharge into the detector and may damage the detector, particularly the thin sheet covering (discussed hereinafter). The problem of static charges is particularly important in the present invention where the garments are conveyed so closely adjacent the detectors. Static charges can also attract dust/debris (which may shield particles from the detectors) or cause electric noise (which may produce an erroneous radiation signal). Charges may also deflect and distort the particle path allowing it to escape detection. In addition, static charges can attract naturally occurring radon gas daughter products, causing false alarms due to background radiation. For all these reasons, static charges must be minimized, particularly in the present, highly sensitive arrangement.

Impregnation of the belts with an electrically conductive material, such as graphite, allows charges to dissipate, thereby reducing the above-mentioned negative effects. The belts are further coated with TEFLON (polytetrafluoroethylene). This provides a smooth outer surface to allow the belts to ride atop one another without entangling and/or catching of the garments between the belts. Moreover, the TEFLON coating serves as a bearing surface as the belts pass over the detectors (or more particularly, as the belts pass over the protective grid covering of the detectors discussed hereinafter). The TEFLON coating also reduces the possibility that contaminants will stick to or lodge in the belt.

As the garments are grasped by the conveyers, debris or dust is collected by a collection tray 32. To further reduce contaminants in the system, a high efficiency particulate air filtering system 50 (FIG. 1) is utilized. Alternatively, the system may be connected to the air filtering system in the facility in which it is operated. The enclosed and ventilated arrangement surrounding the conveyers prevents the spread of contaminants that may accumulate within the housing.

After passing the debris collection tray, the garment passes over lower and upper radiation detectors 34,36 which monitor particles emitted from both sides of the garment. As discussed above, the conveyer belts grasp and compress the garment for close association with the detectors. In addition, to further hold the garments close to the detectors, biasing members in the form of biased skids 38,40 urge the garments towards their respective detectors. These skids 38,40 provide uniform pressure against garments of non-uniform thickness. Preferably, at least three skids are arranged across the conveyer to insure that all portions of the garment are urged toward the detectors. While it is possible to use a single large skid of substantially the same width as the conveyers, the use of smaller spaced skids is preferred for reducing rubbing contact between the belt/garments and the skids. More importantly, the use of separately biased skids allows for a more uniform pressure to be placed on substantially the entire garment, even if the garment is of non-uniform thickness. If a single skid is utilized, a thick portion of a garment can articulate the entire skid, leaving other portions of the garment uncompressed. Applicants have found the use of three skids, positioned in a row extending transverse to the belt, to be suitable in applying pressure to substantially the entire area of the garment.

The skids are biased by coil springs 39, however other types of springs may be utilized in accordance with the present invention. The spring force must be sufficient to maintain the garments substantially flush against the detectors. The selection of an appropriate spring is particularly important for the upper detector, where the weight of the garment must also be accommodated. As shown in FIG. 2, the detectors are spaced along the path of travel to allow the skids to bias one side of each garment toward each detector as the garment is conveyed.

Gas flow proportional detectors are utilized for the radiation detectors 34,36. Gas flow proportional detectors generally include one or more gas containing chambers formed in a conductive housing. The housing acts as a cathode with electrodes within the chamber acting as anodes. The detectors 34,36 are closely spaced to minimize the overall length of the conveyer. However, enough spacing is needed to allow for the transition of the bulging of the belt from the first detector to the second. More specifically as the garment passes over the first detector 34, the belt bulges upwardly accommodating the garment thickness while maintaining the lower portion of the garment substantially flat adjacent the lower detector. The second conveyer 36 should be sufficiently spaced such that the upper belt does not interfere with the second detector and the conveyer can bulge downwardly to accommodate the garment, while the upper belt and the upper portion of the garment become substantially flat adjacent the upper detector. Applicants have found a nominal spacing of four inches to be suitable.

In the preferred embodiment, a detector having six separate gas chambers or detection zones is utilized. As shown in the side view of FIG. 3, the detectors include radiation sensitive zones 51 with wiring 56 connecting the electrodes to a high voltage source. The zones are sealed at the radiation sensitive side of the chamber with a thin sheet 52 of an aluminized polyester material such as MYLAR. The sheet is thick enough to withstand the pressure of the gas within the chamber and any incidental mechanical contact, yet thin to allow penetration of radioactive particles. The gas in the chambers is a P-10 counting gas of 90% argon and 10% methane. The gas is distributed to the zones using a gas manifold (not shown) within the detector to uniformly distribute an exhaust gas from the detector, thereby supplying a constant flow of gas through the chambers in a known manner.

Figure 3:
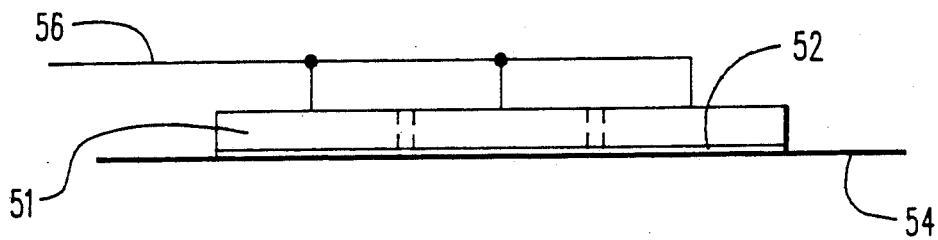
FIG. 3 is a side view of a radiation detector.

Due to the delicate nature of the MYLAR cover, control of static charges and debris, as mentioned above, is extremely important in avoiding costly and time consuming maintenance. Particularly since the conveyer and garment are urged toward the detectors, a protective screen 54 is provided for each of the detectors as shown in FIG. 3. The screen is of a mesh or grate arrangement having at least 70% of its area open. Preferably, the screen is formed of smooth stainless steel to allow the conveyer belt to slide over the screen without becoming entangled. The TEFLON coated belt provides for good sliding contact over the smooth stainless steel screen such that the biasing skids can hold the garment closely adjacent the detectors as the garments are conveyed.

The width of the conveyer belts is approximately 38 inches. This width is sufficient to expose garments within the scanning zone of the detectors, which is approximately 36 inches in the direction of the belt width, while allowing for a one inch hem or seam at each edge of the belt. The skids or pressure plates are approximately 16 inches long in the direction of the conveyer path, and 11½ inches wide with approximately ¼ inch spacing between adjacent skids in the three skid arrangement. These dimensions are illustrative only, and it is to be understood that various size and spacing relationships of the belts, skids and detectors can be utilized in accordance with the present invention.

Figure 4A:
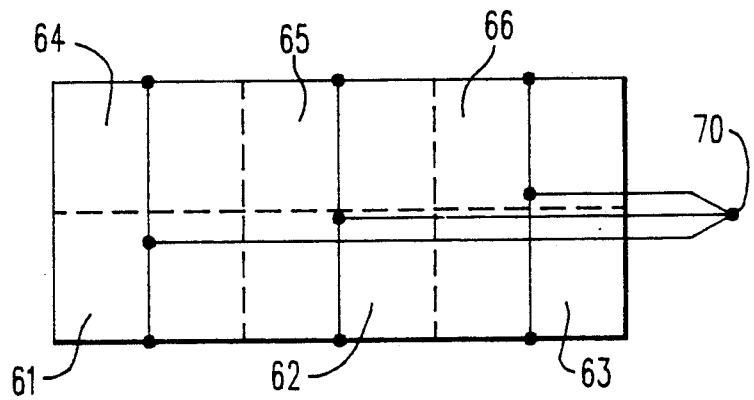
FIGS. 4A and 4B show a rear view of radiation detectors, illustrating different wiring arrangements of the detector of FIG. 3.
Figure 4B:
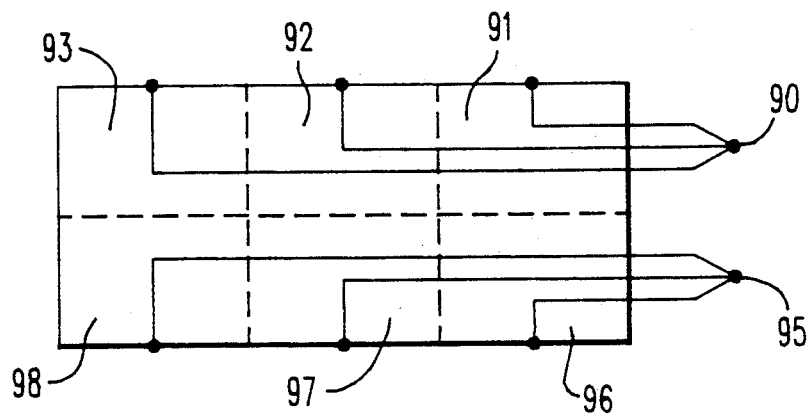

FIGS. 4A and 4B show the back of the detectors (i.e., looking from the top of FIG. 3) and illustrate two arrangements for the electrical connections of the detectors in accordance with the present invention. As above, the gas flow manifolds are omitted for clarity.

In FIG. 4A, six detection zones 61-66 are shown. In use, the detector is mounted such that the rows of three are situated transverse to the conveyer movement. This arrangement is utilized for the detection of alpha particles only. Shielded coaxial cables 70 connect the electrodes of each zone to a source of high voltage. The voltage is selected to be within a range optimized for the detection of alpha particles. As shown in FIG. 4A, each of the zones in the direction of conveyer movement (i.e., 66-63, 75-62 and 64-61) are commonly connected. Thus, the length of each detection zone is effectively doubled, doubling the residence time and increasing the sensitivity of the detector by the square root of two. In other words, a garment could be conveyed at 1.4 times the speed while maintaining the same sensitivity to detection as compared to the arrangement where only one zone is present in the path of conveyance. The FIG. 4A arrangement is utilized where high sensitivity to alpha particles is required, or where high conveyer speeds are desired.

Figure 5:
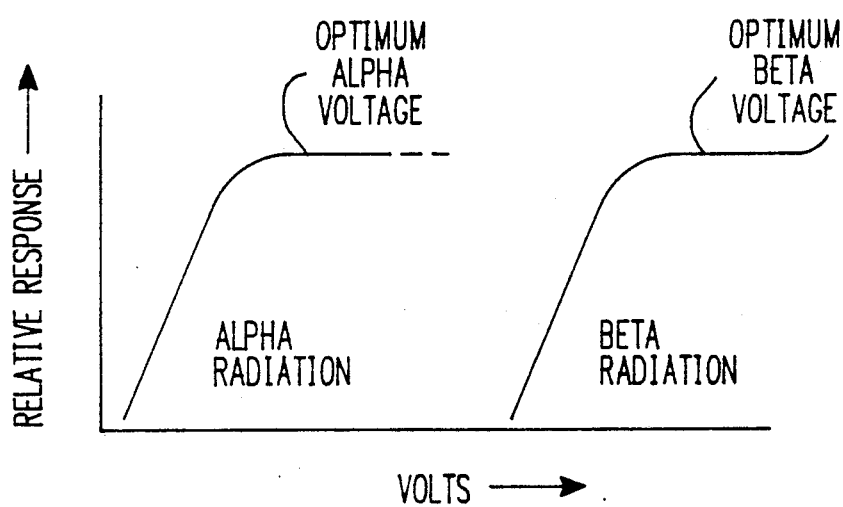
FIG. 5 illustrates voltage operating characteristic curves for alpha and beta particles.

The detectors may also be operated for detection of both alpha and beta particles. As shown in FIG. 5, the optimum voltages for detecting alpha and beta particles are different. In the past, where it was desired to sense both alpha and beta particles using a single detector, a compromise voltage was utilized. In general, an increase in the voltage is accompanied with an increase in the background noise. Thus, when a compromise voltage is utilized, detection of alpha particles becomes difficult due to the increased background noise (which is generally large compared to a typical alpha count), and has poor sensitivity to beta particles since it is low in the beta response range.

The arrangement in FIG. 4B allows detection zones in the direction of conveyer travel to be operated independently, at the optimal points of the voltage operating characteristic curves for both alpha and beta particles. Zones 91-93 are operated at a voltage optimized for the detection of alpha radiation, and are connected to a high voltage by coaxial cables 90. Zones 96-98 are connected to a source of high voltage optimized for the detection of radiation having much lower specific ionization, such as beta particles, gamma and x-rays. The zones are connected to a common voltage source via coaxial cables 95. As a garment passes under the detector, it first passes under zones 91-93 optimized for alpha sensing, and then passes under zones 96-98 optimized for beta sensing. It is to be understood that either the alpha sensitive detectors of FIG. 4A or the alpha-beta detector of FIG. 4B may be utilized in the present invention, provided both detectors 34,36 are the same type.

In operation, electrical pulse signals of approximately 1-100 mv are received from each zone. The pulses are transmitted through shielded cable to electronic amplifier and discriminator circuits. The discriminator circuit determines whether the signals are alpha or beta, depending upon the magnitude of the pulse. In the alpha-beta detector, since each zone is operated at a voltage optimized for the detection for alpha and beta particles, respectively, it is easier to discriminate the type of particles sensed. A counter is provided in a microprocessor program to generate an alarm when the number of counted pulses exceeds a predetermined number. Lights on the control panel indicate whether the contamination is alpha or beta.

Often it is desired to prevent contaminated particles from entering the environment containing the previously tested uncontaminated articles. Therefore, a jog reverse function is utilized which causes the belt to run backwards after contamination is detected. In accordance with the present invention, the auto reverse causes the conveyers to run backwards at the maximum drive speed of the drive components. Thus, even though the operator has selected a slow forward drive for detecting contamination, after contamination has been detected, the article is sent back to the entrance at maximum speed, thus increasing the overall speed of operation.

We claim:

1. An apparatus for detecting radioactive contamination in garments comprising:
   means for conveying garments along a path;
   a first radiation detector having at least one detection zone optimized for sensing alpha particles positioned below said path;
   a second radiation detector positioned above said path and likewise having at least one detection zone optimized for sensing alpha particles, wherein one of said first and second detectors is positioned downstream from the other of said first and second detectors;
   first bias means for urging said garments toward said first radiation detector; and
   second bias means for urging said garments toward said second radiation detector means.

2. The detecting apparatus of claim 1, wherein each of said detectors includes a plurality of radioactive sensitive zones, at least one of said zones sensitive to alpha particles, and at least one of said zones sensitive to beta particles.

3. The detecting device of claim 2, wherein said detectors are gas-flow proportional detectors, each of said detectors further comprises:
   a first row of zones extending transverse to said path and first row of zones operated at a voltage optimized for sensing alpha particles; and
   a second row of zones extending transverse to said path and located adjacent to said first row, said second row of zones operated at a voltage optimized for sensing beta particles.

4. The apparatus of claim 1, wherein said means for conveying includes a thin conveyer belt, said belt having a plurality of openings to decrease shielding effects of the belt.

5. The apparatus of claim 4, wherein said belt is formed of a fibrous material with approximately 70% of the area of said belt comprised by said openings.

6. The apparatus of claim 4, further including a screen associated with each of said detectors, said screen having an open area of at least 70%.

7. The apparatus of claim 6, wherein said belt includes a coating, said coating acting as a bearing surface as the belt passes over said detectors.

8. The apparatus of claim 4, wherein said belt is impregnated with an electrically conductive material to dissipate static charges.

9. The apparatus of claim 1, wherein said conveyer means includes a pair of endless belts, said belts grasping, compressing and conveying garments therebetween.

10. The apparatus of claim 9, wherein each of said belts include fiberglass strands running substantially transverse to the belt and nylon strands running in a longitudinal direction of said belt.

11. The apparatus of claim 1, further including a housing enclosing said means for conveying and said radiation detectors, air filtering means for removing airborne particles within said housing and a debris collection tray located adjacent said means for conveying for collecting debris which falls from garments.

12. The apparatus of claim 3, further including a counter which counts pulses received from said detector, and means for actuating an alarm when the counted pulses exceeds a predetermined value;
said device further including pulse discriminating means for determining whether detected radiation is alpha or beta.

13. An apparatus for detecting radioactive contamination of garments comprising:
a radiation detector;
a conveyer formed of one or more non-metallic fibrous materials impregnated with an electrically conductive substance and coated with a non-stick coating.

14. The apparatus of claim 13, wherein said conveyer includes transverse strands and longitudinal strands with openings formed between said strands wherein said open areas form approximately 70% of the area of said conveyer.

15. The apparatus of claim 14, wherein said transverse strands are formed of fiberglass and said longitudinal strands are formed of a nylon fiber.

16. The apparatus of claim 14, wherein said nylon fiber is a copolymer of meta-phenylenediamine and isophthaloyl chloride.

17. The apparatus of claim 13, wherein said electrically conductive substance is graphite and said non-stick coating is polytetrafluoroethylene.

18. The apparatus of claim 13, wherein said apparatus includes first and second conveyers in opposed relation with a garment path of travel between said conveyers such that said garments are compressed between said conveyers, said apparatus including two radiation detectors, said detectors located on opposite sides of said garment path of travel and spaced apart in the direction of said garment path of travel.

19. The apparatus of claim 18, wherein said detectors include screens covering respective radiation receiving faces of said detectors, said screens having a plurality of openings, said detectors mounted closely adjacent to said conveyers such that each of said conveyers is in sliding contact with one of said detectors as said garments are compressed and conveyed past said detectors.

20. The apparatus of claim 19, wherein said radiation detectors are gas-flow proportional detectors, each detector having a plurality of separate detection zones, at least one zone of each detector operated at a voltage optimized to detect alpha particles, and at least one zone of each detector operated at a voltage optimized to detect beta particles.

21. The apparatus of claim 13, further including control means for setting a speed of the conveyer; and
automatic reverse means for reversing the direction of conveyer movement upon the detection of radiation contamination, said automatic reverse means causing the conveyer to operate at maximum speed in the reverse direction regardless of the setting of the control means.

22. An apparatus for detecting radioactive particles in garments comprising:
a conveyer system for conveying said garments along a path; and
first and second radiation detectors respectively located above and below said path wherein each of said detectors includes at least one alpha sensitive zone and a separate beta sensitive zone adjacent said alpha sensitive zone along said path.

23. The apparatus of claim 22, wherein each of said detectors further includes a plurality of alpha sensitive zones arranged in a row extending transverse to said path and a plurality of beta sensitive zones arranged in a row extending transverse to said path.

24. The apparatus of claim 23, wherein said detectors are gas-flow proportional detectors, said alpha sensitive zones operated at a voltage optimized for sensing alpha particles and said beta sensitive zones operated at a voltage optimized for sensing beta particles.

25. The apparatus of claim 22, wherein said conveyer system includes a pair of conveyers which grasp and compress garments as they are conveyed past said detectors, and bias means associated with each detector for urging said articles toward each respective detector.

26. The apparatus of claim 25, wherein said detectors are spaced in the direction of said path, and wherein each of said detectors includes a protective screen, said bias means urging said garments toward said detectors such that one of said pair of conveyers is in sliding contact with a protective screen of said first detector as a garment is conveyed past said first detector and the other one of said pair of conveyers is in sliding contact with a screen of said second detector as a garment is conveyed past said second detector.

27. The apparatus of claim 22, wherein said conveyer system includes at least one belt, said belt impregnated with an electrically conductive material to promote dissipation of static charges.

28. A process for detecting radioactive contamination in garments with first and second radiation detectors having separate detection zones, comprising the steps of:
conveying garments past said first and second radiation detectors while compressing said garments and biasing said garments toward said detectors, and
operating at least one zone of each detector under conditions optimized for sensing alpha particles, and operating at least one zone of each detector under conditions optimized for sensing beta particles.

29. The process of claim 28, wherein said biasing step includes biasing said garments toward said detectors to an extent that belts conveying said garments are in sliding contact with protective screens associated with each detector.

30. The process of claim 28, further including providing a counter for counting pulse signals from said detectors and generating an alarm after a predetermined number of pulse signals are counted.

31. The process of claim 28, further including providing conveyer belts having means for dissipating static charges.

32. An apparatus for detecting radioactive contamination in garments comprising:
means for conveying garments along a path;
a first radiation detector positioned below said path;
a second radiation detector positioned above said path, wherein one of said first and second detectors is positioned downstream from the other of said first and second detectors;
first bias means for urging said garments toward said first radiation detector; and
second bias means for urging said garments toward said second radiation detector means.

* * * * *